(12) United States Patent
McAlpine et al.

(10) Patent No.: US 6,273,655 B1
(45) Date of Patent: Aug. 14, 2001

(54) ANCHORING DEVICE

(75) Inventors: James Kenneth McAlpine, Barrhead; James Edward McAlpine, Paisley, both of (GB)

(73) Assignee: McAlpine & Co. Ltd., Hillington (GB)

( * ) Notice: Subject to any disclaimer, the term of this patent is extended or adjusted under 35 U.S.C. 154(b) by 0 days.

(21) Appl. No.: 09/486,976

(22) PCT Filed: Sep. 4, 1998

(86) PCT No.: PCT/GB98/02670

§ 371 Date: Mar. 6, 2000

§ 102(e) Date: Mar. 6, 2000

(87) PCT Pub. No.: WO99/11940

PCT Pub. Date: Mar. 11, 1999

(30) Foreign Application Priority Data

Sep. 4, 1997 (GB) .................................................. 9718733

(51) Int. Cl.[7] .............................. F16B 13/04; F16B 13/06
(52) U.S. Cl. ............................... 411/34; 411/37; 411/72
(58) Field of Search .................................. 411/34–38, 55, 411/71, 72

(56) References Cited

U.S. PATENT DOCUMENTS

| 2,365,372 | * | 12/1944 | Allen | 411/34 X |
|---|---|---|---|---|
| 2,456,480 | * | 12/1948 | Austin | 411/34 X |
| 3,306,053 | * | 2/1967 | Fulton | 411/34 X |
| 4,472,088 | | 9/1984 | Martin | . |
| 4,563,118 | * | 1/1986 | Liljedahl | 411/34 |

FOREIGN PATENT DOCUMENTS

| 353 879 | 6/1961 | (CH) . |
|---|---|---|
| 917 999 | 9/1954 | (DE) . |
| 86 06 331 U | 8/1986 | (DE) . |
| 0 105 829 A1 | 4/1984 | (EP) . |
| 0 494 741 A1 | 7/1992 | (EP) . |
| 1056501 | 3/1954 | (FR) . |
| 433038 | 8/1935 | (GB) . |
| 685643 | 1/1953 | (GB) . |
| 774002 | 5/1957 | (GB) . |
| 886400 | 1/1962 | (GB) . |
| 1530344 | 10/1978 | (GB) . |
| 2 090 060 | 7/1982 | (GB) . |
| WO 97/32141 | 9/1997 | (WO) . |

* cited by examiner

*Primary Examiner*—Neill Wilson
(74) *Attorney, Agent, or Firm*—Pennie & Edmonds LLP

(57) ABSTRACT

An anchoring device (10) comprises a resilient sleeve (16) for receiving an elongate member, such as a bolt (18), and first and second stoppers (20,21) for location on the bolt at respective ends of the sleeve. Movement of the stoppers (20,21) towards one another causes the sleeve (16) to expand radially. The inner first stopper (20) may engage one of the bolt head (22) and nut (24) to resist relative rotation thereof. Alternatively, the inner first stopper may be threaded.

22 Claims, 5 Drawing Sheets

ANCHORING DEVICE

FIELD OF THE INVENTION

This invention relates to an anchoring device, and in particular but not exclusively to an expansible bolt anchoring device.

BACKGROUND OF THE INVENTIONS

Expansible bolt anchoring devices are widely used for attaching articles to, for example, the surfaces of masonry or brick walls or structures. A typical anchoring device comprises a segmented right cylindrical shell, and an expansion member located in the shell. The expansion member may be in the form of a nut mounted on the bolt (a "loose bolt" anchor) or may form the head of the bolt (a "projecting bolt" anchor). The expansion member is initially positioned at the inner end of the segmented shell such that rotation of the bolt, or rotation of a nut on the shank of the bolt, will draw the expansion member into the shell and radially expand the shell. Thus, when the device is located in a hole of corresponding diameter to the segmented shell, tightening the bolt or nut expands the shell radially to engage the hole wall.

Tightening of the bolt or nut in the desired "one-handed" manner requires that the shell engages the hole wall and is held against rotation in the hole. This requires that the shell is a snug fit in the hole, which is often difficult to achieve. In the absence of such a close fit, the shell must be held or jammed in the hole by some other means, such as part-filling the hole with packing material.

The three or four segments which typically form the shell are conventionally formed of cast or pressed metal. The segments are held together in the desired cylindrical form around the bolt by a ferrule placed over one end of the segments. A spring clip also encircles the segments intermediate their ends to prevent the shell segments from falling apart. Not surprisingly, the assembly of expansible bolt anchoring devices is a relatively difficult and time-consuming task and is still, in the main, a manual operation.

The majority of segments utilized in existing anchoring devices are relatively rigid and are only subject to minor deformation on the bolt or nut being tightened to expand the shell to engage the segments with the hole wall. Accordingly, the segments tend to engage the hole wall with a point or line contact, such that pressure forces experienced by the hole wall are relatively high and tend to cause a degree of crushing of the masonry or brickwork. A limited degree of such crushing may be advantageous, serving to anchor the shell securely in the hole. However, in softer materials the surrounding stone may crumble to such an extent that the device will not remain in the surface, requiring drilling of a larger hole and use of a larger diameter device.

Numerous proposals have been made to provide bolt anchoring devices with solid resilient sleeves in place of the conventional segmented metal sleeves. Devices of this type are described in GB-A-685643, GB-A-1530344, GB-A-774002, GB-A-886400, EP-A-0494741, EP-A-0105829 and U.S. Pat. No. 4472088. However, these devices have not been adopted by the industry and the resilient sleeve anchor bolts currently available on the market are provided for non-load bearing applications only.

SUMMARY OF THE INVENTION

According to the present invention there is provided an anchoring device comprising: an elastomeric sleeve for receiving a threaded elongate member; inner first and outer second stopper portions each having tubular portions extending into respective ends of the sleeve, the inner first stopper portion defining a thread for co-operating with the elongate member, whereby movement of the stopper portions towards one another causes the sleeve to expand radially.

The device may be supplied on its own or with an appropriate elongate member, typically a bolt or threaded stud. The bolt may be a hexagonal bolt, eye bolt or indeed any form of bolt. The device may be supplied to a customer as a single part or unit that may then be matched with an appropriate elongate member as desired; this is not possible with prior art devices in which the elongate members are integral parts of the devices and if the member is removed the devices tend to fall apart. This feature greatly reduces the level of stock of devices which must be held, and even where a device is supplied with a particular elongate member this may be readily removed and replaced with another member if desired. Further, the device is intended to be suitable for use in a wide range of applications, including load-bearing applications, unlike the vast majority of anchoring devices currently available, which are intended only for single applications.

In a preferred embodiment the inner first stopper is of metal, typically steel, although other materials, such as polymers and composites may be utilized where the application permits. In certain embodiments, the first stopper portion may itself define a thread for engagement with the threaded inner end of a bolt or the like, and in such embodiments the stopper portion will likely be formed of metal.

Preferably, the tubular portion of the inner first stopper is of a length at least equivalent to the diameter of the threaded elongate member, and is preferably of a length greater than the elongate member diameter. In a preferred embodiment, the tubular portion is around three times the length of the member diameter. Surprisingly, it has been found that the length of the tubular member is important in maintaining the resistance of the device to fatigue. Extensive testing revealed that damage to the sleeve resulting from cyclic axial loading of the device was minimized or avoided when the tubular member was extended. Further, it has been found that providing a relatively long tubular portion facilitates an overall reduction in the sleeve wall thickness and sleeve diameter relative to the diameter of the elongate threaded member, such that the ratio of sleeve wall thickness to elongate member diameter may be between 1:4 and 1:8. Accordingly, the diameter of the bore drilled to accommodate the device may be reduced, allowing the bores to be drilled relatively quickly and with less effort.

Preferably, the inner first stopper consists of a flange for engaging the respective end of the sleeve and an internally threaded tubular portion extending into the end of the sleeve. This arrangement allows a relatively short device to provide a relatively great effective depth, that is the inner sleeve end, which is expanded to grip the bore wall, is adjacent the end of the device. Thus, it is not necessary to drill a bore to accommodate a relatively long inner first stopper extending beyond the sleeve end; when a large number of bores are being drilled to accommodate such devices this aspect of the invention may result in a considerable saving in time and effort.

Preferably also, at least the outer second stopper portion is of a relatively rigid material, typically metal, but possibly a polymer-based material such as polypropylene.

The outer second stopper portion may be provided with a lip, for engaging a hole edge and preventing the device from falling into the hole. In other embodiments, in particular for through bolt applications, the lip may be omitted.

The stopper portions may be provided separately, or may be integral with the sleeve.

Preferably, the tubular portions are an interference fit in the respective sleeve ends or may snap fit in the respective sleeve ends. The tubular portions may be knurled or otherwise finished to provide engagement with the sleeve, or may be bonded to the sleeve ends using a suitable adhesive.

Preferably also, the sleeve is of rubber, and may be a natural rubber or a thermoset or thermoplastic rubber. Preferably, the sleeve material has a tensile strength of between 10 and 25 megapascals (MPa), and satisfactory test results have been obtained using rubber having a tensile strength of 18 MPa. Preferably also, the sleeve material has a compression set of no more than 50%; above this, the set sleeve may tend to "relax", reducing the holding force provided by the device. Most preferably, the sleeve material is selected such that the sleeve will only experience elastic deformation in use, however in certain applications materials which are also deformed plastically may be utilized. Sleeves which deform substantially elastically allow an installed device to be removed for inspection and reinstalled. Preferably also, the wall of the sleeve is continuous.

Preferably also, the sleeve is generally cylindrical. Most preferably, a profile extends radially outwardly from the sleeve, to assist in holding the device in a bore. The profile is preferably located centrally of the sleeve and may be in the form of an annular rib. The profile results in a thickening of the sleeve wall and thus serves to strengthen the sleeve.

Preferably also, the sleeve ends are counterbored to receive the tubular portions, the tubular portions serving to support the reduced wall thickness portions of the sleeve wall.

In other embodiments, the sleeve defines a throughbore of substantially constant diameter and the tubular portions define bores of corresponding diameter. Accordingly, the ends of the sleeve must deform to receive the stopper portions. To accommodate this deformation the ends of the sleeve may be of reduced cross section. A reduction in cross-section of the sleeve inner end has also been, found useful in ensuring that deformation of the sleeve is initiated at the inner end.

According to another aspect of the present invention there is provided an anchoring device comprising: an is elastomeric sleeve for receiving a threaded elongate member; inner first and outer second stopper portions located at respective ends of the sleeve, the inner first stopper consisting of a flange for engaging the respective end of the sleeve and an internally threaded tubular portion extending into the end of the sleeve, whereby movement of the stopper portions towards one another causes the sleeve to expand radially.

According to a further aspect of the invention there is provided an anchoring device comprising: an elongate member defining a threaded shank and a head; a threaded nut for location on the shank; a resilient sleeve for receiving the elongate member; and inner first and outer second stopper portions at respective ends of the sleeve between the head and nut, the inner stopper portion engaging one of the head and nut and means being provided for coupling the inner stopper portion and the one of the head and nut to resist relative rotation thereof, whereby movement of the stopper portions towards one another, by relative rotation of the elongate member and the nut, causes the sleeve to expand radially.

Engaging the head or nut with the inner stopper in this manner facilitates installation of the device.

Preferably, the means is in the form of protrusions or indentations provided on the one of the head and nut. Alternatively, the means may be a lock washer or an adhesive.

Preferably also, the first stopper portion captures one of the head and nut. The head and nut are preferably of corresponding form such that the elongate member may be positioned with either the head or the nut restrained by the first stopper, that is the elongate member orientation is reversible. This permits a single device to be provided for both loose bolt and projecting bolt applications. Typically, the first stopper portion will define a hexagonal recess.

In use, embodiments of the anchoring devices of these various aspects of the invention may be located in holes in, for example, a masonry or brick wall, and the stopper portions then brought together to expand the sleeve to engage with the wall. As the sleeve is formed of resilient material the contact area between the sleeve outer surface and the hole wall is likely to be relatively large, and thus hold the device securely in the hole. The relatively large contact area between the sleeve and the hole wall also minimizes the pressure forces experienced by the material defining the hole wall, facilitating secure location in softer materials such as sandstone and breeze block. The sleeve is also capable of expanding in a nonuniform manner, facilitating secure location in irregularly shaped holes, and allowing holes to be sealed by the sleeve. This also facilitates anchoring of the device in cavity walls and the like.

The resilient sleeve will also tend to make the device less prone to loosening in applications in which the device experiences vibration, movement or temperature changes. Further, the resilient sleeve facilitates removal of the device, as the sleeve will tend to contract radially when permitted to expand longitudinally. A resilient sleeve is also likely to require lower forces to expand when compared to conventional anchors with metal segments, such that there is greater flexibility in the form of tool engaging nuts and bolt heads that may be provided to allow setting of the anchor.

On expansion the sleeve will tend to create a seal with the wall of the hole in which the anchor is located, and will also expand into sealing contact with the elongate member, protecting the inner elements of the anchor from corrosion. Also, the contact between the elongate member and the sleeve will increase the load required to pull the member out of the sleeve.

BRIEF DESCRIPTION OF THE DRAWINGS

These and other aspects of the present invention will now be described, by way of example, with reference to the accompanying drawings, in which.

DETAILED DESCRIPTION OF THE INVENTIONS

Figure 1:
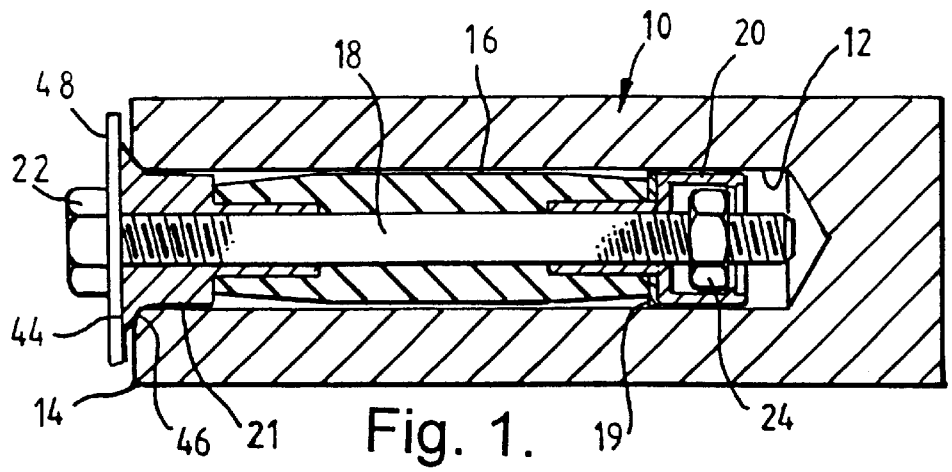
FIG. 1 is a sectional view of an anchoring device in accordance with an embodiment of the invention shown located in a hole.
Figure 5:
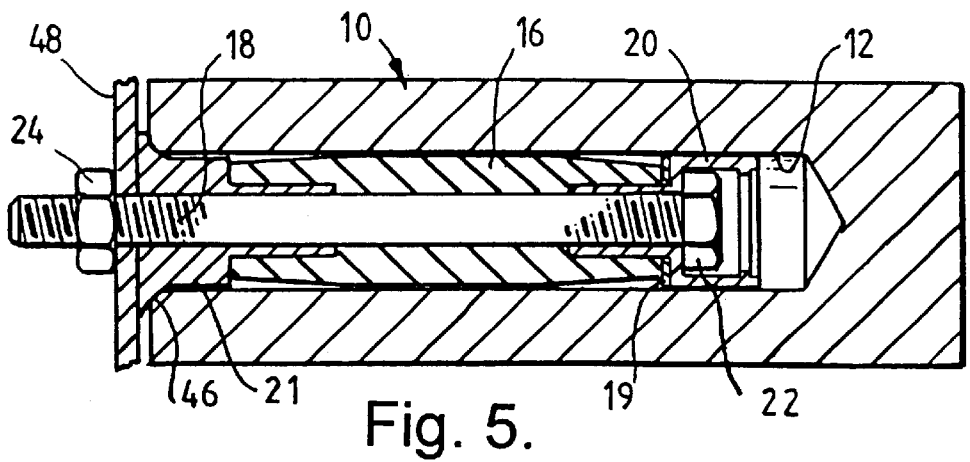
FIG. 5 is a sectional view of the anchoring device of FIG. 1, with the bolt reversed.

Reference is first made to FIG. 1 of the drawings, which illustrates an anchoring device 10 in accordance with an embodiment of the present invention. The device 10 is illustrated located in a hole 12 which has been drilled into a wall 14. The device 10 comprises a rubber sleeve 16, a bolt 18 extending through the sleeve 16, and first and second stoppers 20, 21 mounted on the bolt 18. A steel washer 19 is located between the first stopper 20 and the adjoining end of the sleeve 16. In the "loose bolt" arrangement illustrated in FIG. 1, the bolt head extends from the hole 12, while a nut 24 is located on the inner end of the bolt 18, within the first stopper 20 (FIG. 5 illustrates a "projecting bolt" arrangement, in which the bolt 18 is reversed).

Figure 2:
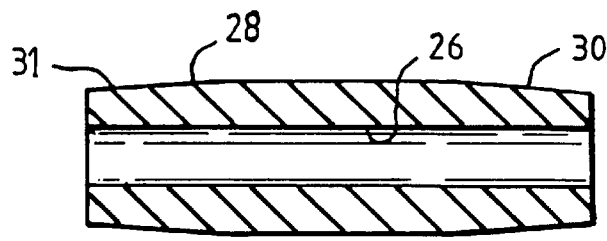
FIG. 2 is a sectional view of a sleeve of the device of FIG. 1.
Figure 3:
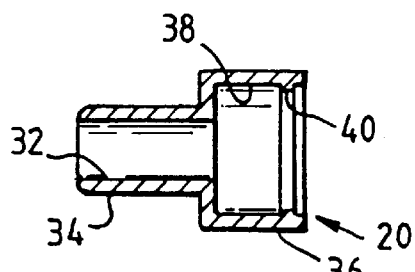
FIG. 3 is a sectional view of a first stopper of the device of FIG. 1.
Figure 4:
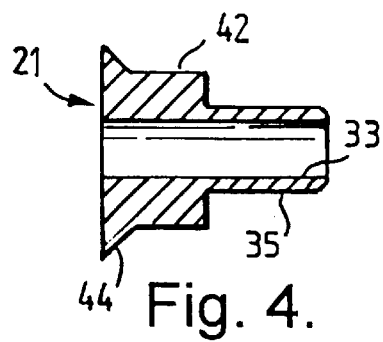
FIG. 4 is a sectional view of a second stopper of the device of FIG. 1.

Reference is now also made to FIGS. 2, 3 and 4 of the drawings, which illustrate the sleeve 16, first stopper 20 and second stopper 21, respectively. The sleeve 16 is formed of moulded natural rubber and defines a throughbore 26 of constant diameter. The sleeve wall 28 tapers towards the sleeve ends 30, 31 such that the sleeve 16 is generally barrel-shaped.

The stoppers 20, 21 are formed of a relatively rigid material, in this example polypropylene. Each stopper 20, 21 defines a respective throughbore 32, 33 of the same diameter as the sleeve bore 26 and includes a reduced cross-section portion 34, 35 which, in use, is located within the respective ends of the sleeve bore 26, as shown in FIG. 1. The external surface of each portion 34, 35 has a rough finish to prevent the stoppers 20, 21 from turning relative to the sleeve 16. The first stopper 20 includes a larger diameter portion 36 abutting the washer 19, which in turn abuts the inner end of the sleeve 16. The portion 36 is of similar diameter to the central portion of the sleeve 16 and defines a hexagonal recess 38 to receive the nut 24. The recess wall defines a lip 40 to facilitate retention of the nut 24 in the recess 38.

The second stopper 21 also includes an enlarged cross-section portion 42 of the same diameter as the central portion of the sleeve 16, for abutting the outer end of the sleeve 16. Further, the stopper 21 defines a tapered flange 44 which, in use, engages the hole edge 46.

It will be noted that the device 10 only consists of six parts, including the nut 24, and bolt 18 and washer 19. The device 10 is assembled simply by pushing the reduced cross-section stopper portions 34, 35 into the ends of the sleeve 16 and through the washer 19, locating the nut 24 in the recess 38, and passing the bolt 18 through the sleeve 16 and stoppers 21, 22 to loosely engage the nut 24. If it is desired to provide a "projecting bolt" anchor, rather than a "loose bolt" anchor as illustrated in FIG. 1, the bolt 18 is simply reversed with the bolt head 22 being located in the recess 38 and the nut 24 being located on the end of the bolt 18 projecting from the second stopper 21, as illustrated in FIG. 5.

If desired, the sleeve 16, washer 19 and stoppers 21, 22 may be moulded together to further minimise the assembly steps required. The sleeve 16 and stoppers 21, 22 may also be supplied to customers without the nut 24 and bolt 18; the customer may then provide a nut and bolt suited to their own particular needs.

In use, the device 10 is located in a hole 12 as illustrated in FIG. 1, and in this example is shown securing a plate 48 to the wall 14. The bolt 18 is then rotated using a suitable tool to engage the bolt head 22. The sleeve 16 and stoppers 20, 21 may be restrained from rotating by contact with the hole wall, and also the tapered flange 44 on the second stopper 21 will engage the hole edge 46, in addition to centering the outer end of the device 10 in the hole 12. Rotation of the bolt 18 relative to the rest of the device 10 will cause the captured nut 24 to be drawn outwardly, pulling the first stopper 20 outwardly, and thus longitudinally compressing the sleeve 16. Such longitudinal compression results in radial expansion of the sleeve 16 into contact with the hole wall. Testing has shown that the radial expansion of the sleeve 16 tends to be initiated adjacent the first stopper 20, and then continues along the sleeve 16 towards the second stopper 21. The sleeve 16 will continue to expand until substantially all of the sleeve outer surface is in contact with the bore wall. This large contact area serves to locate the device 10 in the wall 14 securely, and will also tend to seal the hole 12.

To remove the device 10, the bolt 18 is rotated in the opposite direction, allowing the resilient sleeve 16 to expand longitudinally and contract radially until it returns to its original, undeformed shape and may be removed from the hole 12.

Although the device 10 is illustrated located in a hole 12 in a solid wall 14, testing has indicated that the device 10 may be secured in cavity walls and the like. As noted above, deformation of the sleeve 16 is initiated adjacent the first stopper 20, and thus if the inner end of the device 10 is located within a cavity the sleeve 16 will expand in the cavity to a diameter larger than the hole in the adjacent brick work. The sleeve 16 will also tend to expand to fill and seal the hole, such that the device is held securely in the wall.

For projecting bolt applications, the relatively low forces necessary to expand the sleeve 16 allow the nut 24 to be replaced by other fasteners, particularly low-profile fasteners providing a flange finish on the wall, for example a non-ferrous threaded cap adapted to be rotated using a pin wrench.

Figure 6:
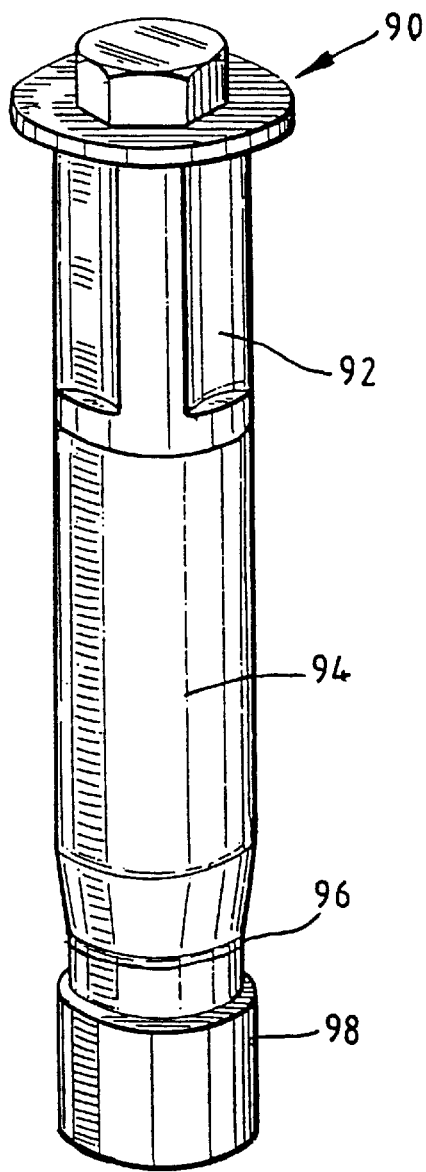
FIG. 6 is an assembly drawing of an anchoring device in accordance with another embodiment of the present invention.
Figure 7A:
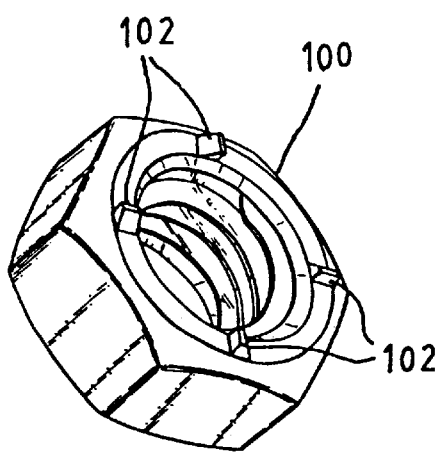
FIG. 7a is an enlarged view of the nut of FIG. 7.
Figure 7:
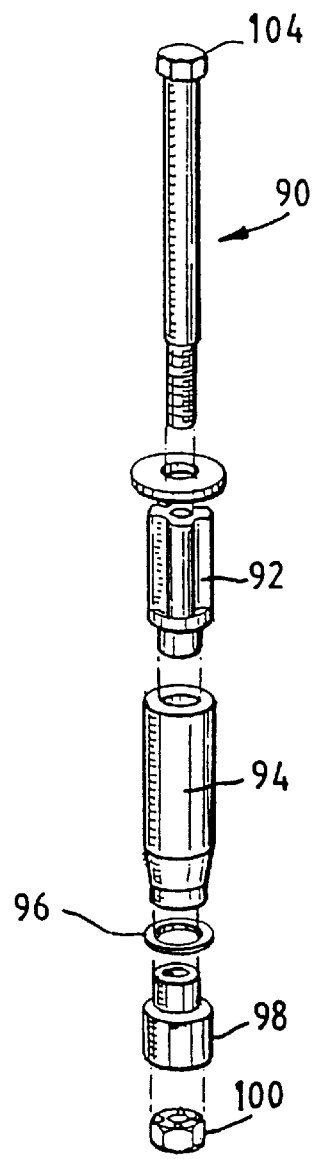
FIG. 7 is an exploded view of the device of FIG. 6.

Reference is now made to FIGS. 6 and 7 of the drawings, which illustrate an anchoring device 90 in accordance with a further embodiment of the present invention. The device 90 includes a second spacer or stopper 92 having a fluted outer surface, which reduces the volume of material required to form the stopper 92, and the sleeve 94 is tapered only at its inner end, to ensure that deformation of the sleeve 94 commences at the inner end.

A washer 96 is provided between the first spacer or stopper 98 and the sleeve 94, which prevents the nut 100 from being pulled through the spacer 98 in extreme conditions.

FIG. 7A is an enlarged view of the nut 100, and illustrates the protrusions 102 provided on the face of the nut and which embed in the plastics material of the stopper 98 when an axial load is applied to the nut 100, on setting the device. This creates a mechanical lock between the nut 100 and the stopper 98 preventing relative rotation. Similar protrusions may also be provided on the screw head 104.

Figure 8:
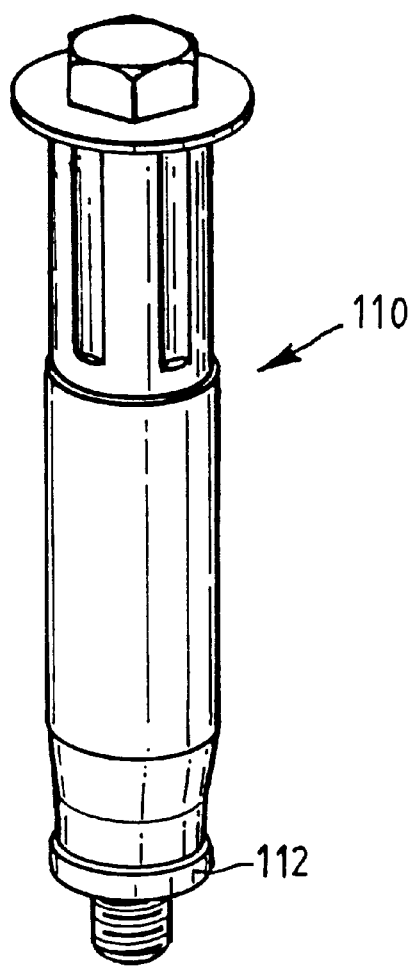
FIG. 8 is an assembly drawing of an anchoring device in accordance with another embodiment of the present invention.
Figure 9:
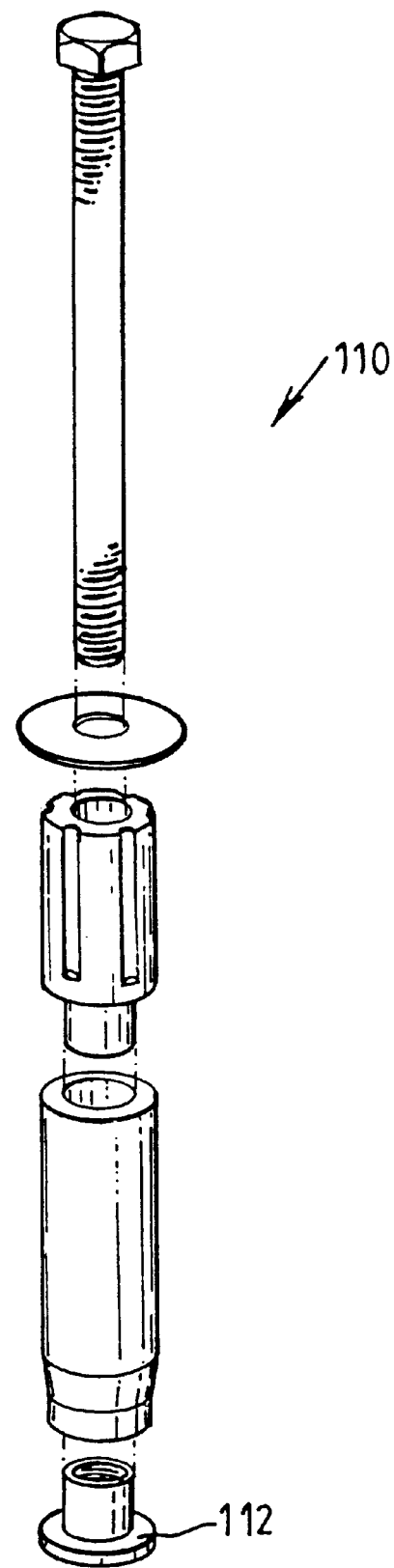
FIG. 9 is an exploded view of the device of FIG. 8.

FIGS. 8 and 9 illustrates a device 110 in which a single internally threaded metal retainer 112 replaces the nut and inner stopper of the earlier embodiments.

Figure 10:
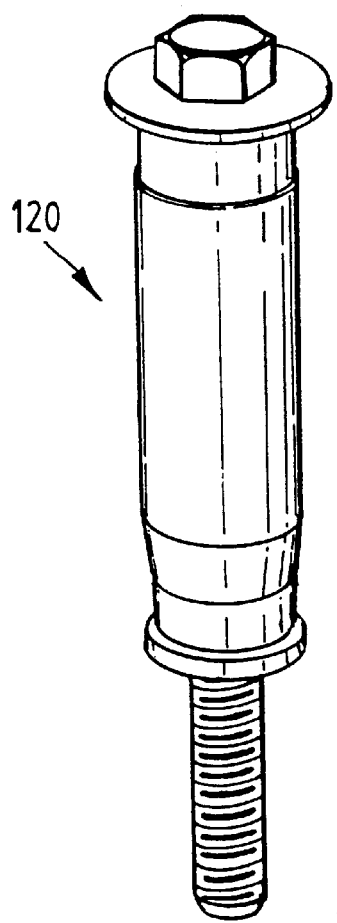
FIG. 10 is an assembly drawing of an anchoring device in accordance with another embodiment of the present invention.
Figure 11:
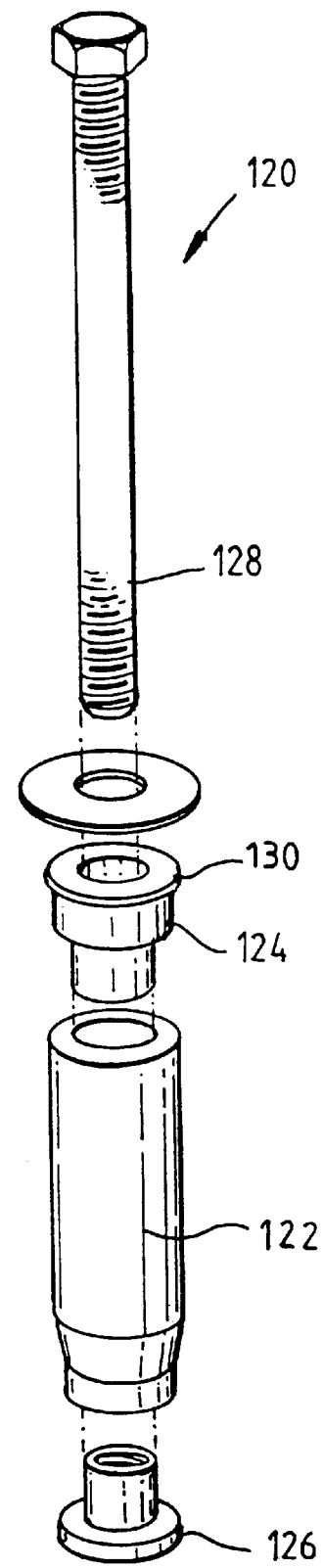
FIG. 11 is an exploded view of the device of FIG. 10.

FIGS. 10 and 11 illustrate a device 120 in which the sleeve 122, outer spacer 124 and inner retainer 126 are located in a drilled hole and the screw 128 then passed through the item to be mounted into the hole. To prevent the sleeve 122 from being pushed into the hole, the spacer 124 is provided with a larger diameter lip 130.

Figure 12:
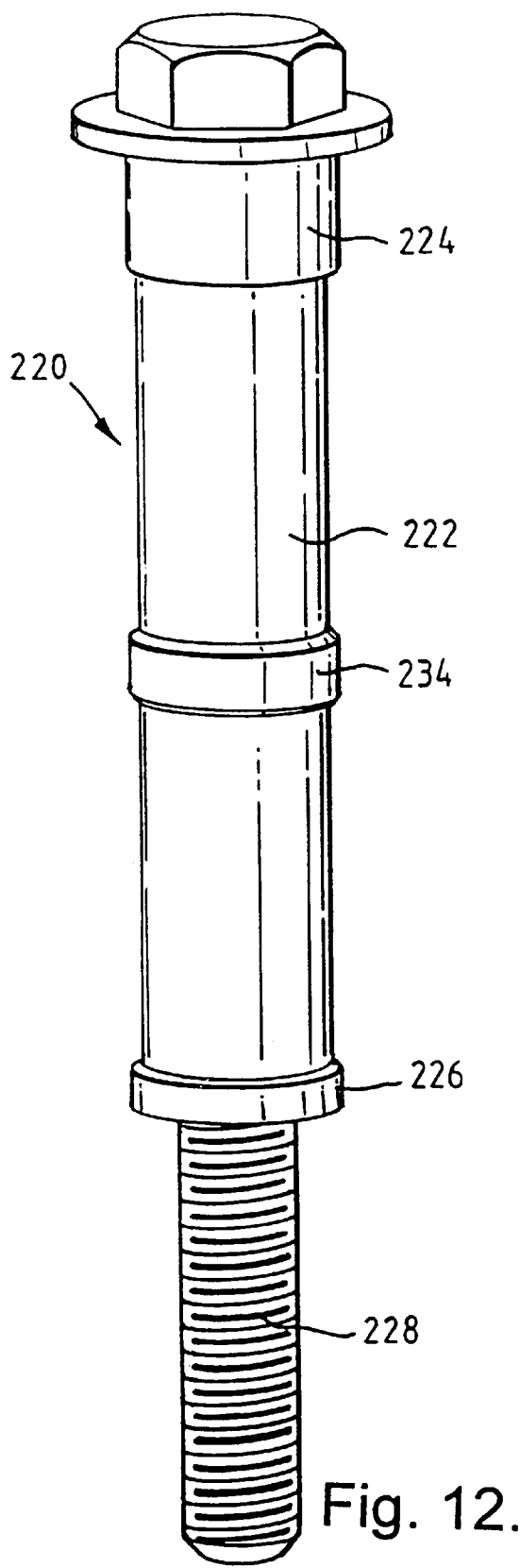
FIG. 12 is an assembly drawing of an anchoring device in accordance with a preferred embodiment of the present invention.
Figure 13:
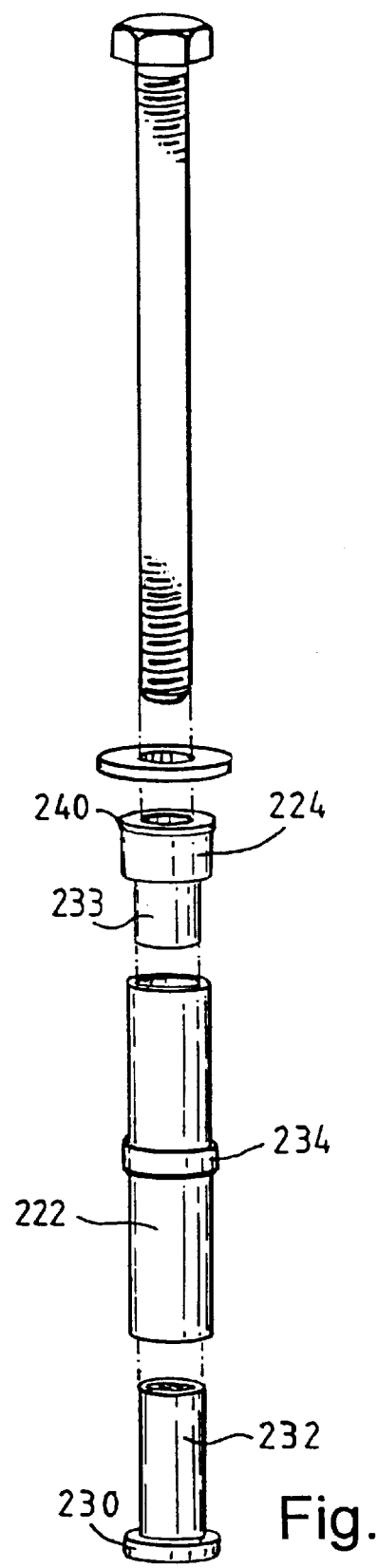
FIG. 13 is an exploded view of the device of FIG. 12.

FIGS. 12 and 13 illustrate a device 220 in accordance with a preferred embodiment of the present invention. The device comprises a natural rubber sleeve 222, a steel outer spacer 224 and an internally threaded steel inner retainer 226. The device 220 is shown located on a threaded bolt 228.

The inner retainer consists of a flange 230 and an internally threaded tubular portion 232 extending into the end of the sleeve 222, the tubular portion 232 being of a length approximately three times the diameter of the bolt. The flange 230 engages the end of the sleeve 222.

The spacer 224 also includes a tubular portion 233, and the tubular portions 232, 233 are an interference fit in the respective sleeve ends. The spacer 224 further defines a lip 240 to assist in preventing the device falling into a drilled bore.

The sleeve 222 is generally cylindrical and has an annular profile 234 extending radially outwardly from the centre thereof, to assist in holding the device in a bore. The sleeve ends are counterbored to receive the tubular portions 232, 233, in an interference fit, the tubular portions serving to support the reduced wall thickness portions of the sleeve wall.

In the illustrated example, the sleeve 222 has an outer diameter of 14 mm, and the bolt 228 is 8 mm in diameter. At the centre, the sleeve 222 defines a bore of 8.1 mm diameter, and at the counterbored sleeve ends the bore diameter is 10 mm.

Extensive testing has demonstrated that the device 220 meets the most stringent standards set for load-bearing anchors and thus appears to be the first polymer/rubber-based anchoring device which may be specified for load-bearing applications.

It will be clear to those of skill in the art that the above-described embodiments are merely exemplary of the present invention, and that various modifications and improvements may be made thereto without departing from the scope of the present invention.

What is claimed is:

1. An anchoring device comprising:
   a threaded elongate member;
   an elastomeric sleeve for receiving the threaded elongate member;
   inner first and outer second stopper portions each having tubular portions extending into respective ends of the sleeve, the inner first stopper portion defining a thread for co-operating with the elongate member, whereby movement of the stopper portions towards one another causes the sleeve to expand radially, the ratio of sleeve wall thickness to elongate member diameter being between 1:4 and 1:8.

2. The device of claim 1, wherein the tubular portion of the inner first stopper portion extending into the sleeve is threaded.

3. The device of claim 1, wherein the inner first stopper is of metal.

4. The device of claim 1, wherein the first stopper portion defines a thread for engagement with the threaded elongate member.

5. The device of claim 1, wherein the tubular portion of the inner first stopper is of a length at least equivalent to the diameter of the threaded elongate member.

6. The device of claim 5, wherein the tubular portion is of a length greater than the elongate member diameter.

7. The device of claim 6, wherein the tubular portion is around three times the length of the member diameter.

8. The device of claim 1, wherein the inner first stopper consists of a flange for engaging the respective end of the sleeve and an internally threaded tubular portion extending into the end of the sleeve.

9. The device of claim 1, wherein the tubular portions are an interference fit in the respective sleeve ends.

10. The device of claim 1, wherein the sleeve is of rubber.

11. The device of claim 1, wherein the sleeve material has a tensile strength of up to 25 megapascals (MPa).

12. The device of claim 11, wherein the sleeve material has a tensile strength of 18 MPa.

13. The device of claim 1, wherein the sleeve material has a compression set of up to 50%.

14. The device of claim 1, wherein the sleeve is generally cylindrical.

15. An anchoring device comprising: an elastomeric sleeve for receiving a threaded elongate member; inner first and outer second stopper portions each having tubular portions extending into respective ends of the sleeve, the inner first stopper portion defining a thread for co-operating with the elongate member, whereby movement of the stopper portions towards one another causes the sleeve to expand radially, wherein a profile extends radially outwardly from the sleeve.

16. The device of claim 15, wherein the profile is located centrally of the sleeve.

17. The device of claim 16, wherein the sleeve ends are counterbored to receive the tubular portions, the tubular portions serving to support the reduced wall thickness portions of the sleeve wall.

18. An anchoring device comprising: an elastomeric sleeve for receiving a threaded elongate member; inner first and outer second stopper portions each having tubular portions extending into respective ends of the sleeve, the inner first stopper portion defining a thread for co-operating with the elongate member, whereby movement of the stopper portions towards one another causes the sleeve to expand radially, wherein the sleeve expands substantially elastically, allowing the device to be set in a bore and subsequently removed for inspection.

19. An anchoring device comprising:
   an elastomeric sleeve having a first diameter for receiving a threaded elongate member;
   inner first and outer second stopper portions located at respective ends of the sleeve, the inner first stopper consisting of a flange for engaging the respective end of the sleeve and an internally threaded tubular portion extending into the end of the sleeve, the flange having a diameter at least as large as said first diameter, whereby movement of the stopper portions towards one another causes the sleeve to expand radially.

20. An anchoring device as claimed in claim 19, wherein the second stopper portion comprises a flange for engaging the respective end of the sleeve, the second stopper portion flange being of a diameter at least as large as said first diameter.

21. An anchoring device for location in a drilled bore, the device comprising:
  an elongate threaded member having inner and outer ends;
  an elastomeric sleeve for receiving said threaded elongate member; and
  inner first and second stopper portions each having tubular portions extending into respective ends of the sleeve and flanges for engaging the respective ends of the sleeve, the inner first stopper portion defining a thread for co-operating with the elongate member, the flange of the first outer stopper portion, for location in an outer end of a drilled bore, having a greater axial extent than the flange of the inner stopper portion, movement of the stopper portions towards one another causing the sleeve to expand radially to engage the wall of the drilled bore, the flange of the first outer stopper portion serving to space the sleeve from the outer end of the bore.

22. The device of claim 21, wherein the flange of the first outer stopper portion comprises a flange portion integral with the tubular portion and a separate spacer portion.

* * * * *